United States Patent
Hasenplaugh et al.

(10) Patent No.: US 8,769,201 B2
(45) Date of Patent: Jul. 1, 2014

(54) TECHNIQUE FOR CONTROLLING COMPUTING RESOURCES

(75) Inventors: William Hasenplaugh, Boston, MA (US); Joel Emer, Acton, MA (US); Tryggve Fossum, Northboro, MA (US); Aamer Jaleel, Hudson, MA (US); Simon Steely, Hudson, NH (US)

(73) Assignee: Intel Corporation, Santa Clara, CA (US)

( * ) Notice: Subject to any disclaimer, the term of this patent is extended or adjusted under 35 U.S.C. 154(b) by 538 days.

(21) Appl. No.: 12/315,331

(22) Filed: Dec. 2, 2008

(65) Prior Publication Data

US 2010/0138609 A1 Jun. 3, 2010

(51) Int. Cl.
| | |
|---|---|
| *G06F 12/00* | (2006.01) |
| *G06F 13/00* | (2006.01) |
| *G06F 13/28* | (2006.01) |
| *G06F 12/08* | (2006.01) |

(52) U.S. Cl.
CPC ........ *G06F 12/0802* (2013.01); *G06F 12/0866* (2013.01); *G06F 12/0862* (2013.01)
USPC ...................................................... 711/118

(58) Field of Classification Search
USPC ....................................................... 711/118
See application file for complete search history.

(56) References Cited

U.S. PATENT DOCUMENTS

| | | | |
|---|---|---|---|
| 4,463,424 A | 7/1984 | Mattson et al. | |
| 4,489,378 A | 12/1984 | Dixon et al. | |
| 4,603,382 A | 7/1986 | Cole et al. | |
| 5,357,623 A | 10/1994 | Megory-Cohen | |
| 5,394,531 A * | 2/1995 | Smith ............................ | 711/136 |
| 6,035,375 A | 3/2000 | Yanai et al. | |
| 6,223,256 B1 | 4/2001 | Gaither | |
| 6,341,331 B1* | 1/2002 | McNutt ......................... | 711/113 |
| 6,604,174 B1* | 8/2003 | Dean et al. .................... | 711/131 |
| 6,829,679 B2 | 12/2004 | DeSota et al. | |
| 7,415,575 B1 | 8/2008 | Tong et al. | |
| 7,681,011 B1* | 3/2010 | Shmuylovich et al. ....... | 711/173 |
| 7,725,657 B2* | 5/2010 | Hasenplaugh et al. ....... | 711/130 |
| 2003/0065886 A1* | 4/2003 | Olarig et al. .................. | 711/129 |
| 2003/0177313 A1 | 9/2003 | Iyer et al. | |
| 2005/0114605 A1 | 5/2005 | Iyer | |
| 2007/0006230 A1 | 1/2007 | Neiger et al. | |
| 2008/0040554 A1 | 2/2008 | Zhao et al. | |
| 2008/0075101 A1 | 3/2008 | Illikkal et al. | |
| 2008/0235457 A1 | 9/2008 | Hasenplaugh et al. | |
| 2008/0235487 A1 | 9/2008 | Illikkal et al. | |
| 2009/0248976 A1* | 10/2009 | Rotithor ........................ | 711/113 |

FOREIGN PATENT DOCUMENTS

EP 0391871 A2 10/1990

OTHER PUBLICATIONS

Uhlig, Volkmar, et al., "Performance of Address-Space Multiplexing on the Pentium", University of Karlsruhe Germany, 2002, pp. 1-15.

(Continued)

*Primary Examiner* — Matthew Bradley
*Assistant Examiner* — Craig Goldschmidt
(74) *Attorney, Agent, or Firm* — Mnemoglyphics, LLC; Lawrence M. Mennemeier

(57) ABSTRACT

A technique to enable resource allocation optimization within a computer system. In one embodiment, a gradient partition algorithm (GPA) module is used to continually measure performance and adjust allocation to shared resources among a plurality of data classes in order to achieve optimal performance.

28 Claims, 4 Drawing Sheets

(56) References Cited

OTHER PUBLICATIONS

Menon, Aravind, et al. "Diagnosing Performance Overheads in the Xen Virtual Machine Environment", First ACM/USENIX Conference on Virtual Execution Environments (VEE'05), Jun. 11-12, 2005, Copyright 2005 ACM,(2005), pp. 1-12.

Neiger, Gil, et al. "Intel® Virtualization Technology: Hardware Support for Efficient Processor Virtualization", Intel Technology Journal, vol. 10, Issue 3, Aug. 10, 2006, pp. 167-179.

\* cited by examiner

TECHNIQUE FOR CONTROLLING COMPUTING RESOURCES

FIELD OF THE INVENTION

Embodiments of the invention relate generally to the field of information processing and more specifically, to the field of allocating resources in computing systems and microprocessors.

BACKGROUND

Allocating resources in a computer system or processor can be difficult. For example, in some computer systems, in which resources, such as cache space, memory, execution resources, etc., are allocated in a "static" fashion (ie., do not change in response to changing resource needs), the computer system or processor may under-service certain processes or threads or over-servicing other processes or threads. However, even in some prior art "dynamic" resource allocation schemes (ie., those that attempt to respond to the changing needs of the threads, processes, etc., which they service), the overhead associated with the dynamic allocation of resources may not be worth the performance benefit provided by the allocation. Therefore, improved resource allocation mechanisms could both improve processor or computing system performance without incurring the overhead, which may abrogate the benefit of the allocation scheme.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
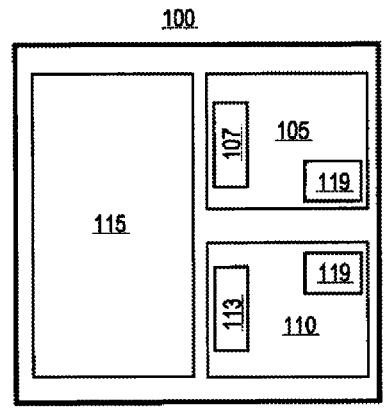
FIG. 1 illustrates a block diagram of a microprocessor, in which at least one embodiment of the invention may be used.

Embodiments of the invention pertain to a dynamic resource allocation technique for improving the overall system or processing performance without incurring overhead that would otherwise abrogate the benefit of the resource allocation techniques described herein. In some embodiments, a dynamic resource allocation scheme can be applied to a number of different processing resources, such as cache allocation among threads, memory resources, and execution resources. For the purpose of illustration, the description below will focus primarily on the example of applying resource allocation techniques, according to at least one embodiment, to cache resources shared by two or more threads. However, embodiments described herein may be applied to other computing resources and other numbers of threads than what is particularly discussed herein.

In one embodiment, a gradient-based partitioning algorithm (GPA) is used to allocate cache space among a plurality of threads. In one embodiment, the GPA uses a state machine, three registers per data class (e.g., streamed data, reused data, etc.) and four global registers not dependent on data class. In one embodiment, a GPA finds optimal allocations of shared resources using a variation of the gradient descent (or "hill climbing") algorithm, where, for each data class, an experiment is conducted, giving that data class incrementally more and then incrementally less of the resource in question to identify a gradient direction. GPA may then measure a "global goodness" metric for both scenarios and allocates the nominal ration of the resource in the identified direction of the gradient to the data class in question according to the experiment. In one embodiment, GPA uses the Chernoff bounds to decide when to adjust the partition of the resource, whereas in other embodiments, other algorithms may be used to determine when to adjust the partition of resources. Furthermore, in one embodiment, the above-mentioned experiment may be conducted for each data class concurrently by partitioning the experiment process across processing cycles (e.g., time-multiplexing for bandwidth or power management, memory-space partitioning for cache or prefetch management).

In some embodiments, the application of GPA to multi-processor systems or multi-core processors that share resources can achieve higher performance and lower power consumption than prior art systems due, in part, to the fact that some embodiments actively optimize resource management on a continual basis. Accordingly, embodiments can lead to longer battery life, more performance per blade, high-density cloud computing, etc.

For instance, in some computing environments, such as those that use server processors, some data is reused (e.g., packet headers, routing tables, instruction data, operating system state, other meta-data like statistics, etc.) and some data is streamed (e.g., packet body information). Using a cache that is not managed according to some embodiments may render the reused data useless, because all of the reused data may be evicted by the streaming data before it has a chance to be reused. In one embodiment, GPA can dynamically determine which data to keep in a cache and which to stream, even in an application which is written with no architecture-aware optimizations, which may be useful in applications, such as virtual machine farm, where applications are neither aware of the processing architecture nor of other applications running on the same machine.

FIG. 1 illustrates a microprocessor in which at least one embodiment of the invention may be used. In particular, FIG. 1 illustrates microprocessor 100 having one or more processor cores 105 and 110, each having associated therewith a local cache 107 and 113, respectively. Also illustrated in FIG. 1 is a shared cache memory 115 which may store versions of at least some of the information stored in each of the local caches 107 and 113. In some embodiments, microprocessor 100 may also include other logic not shown in FIG. 1, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 119 to enable computing resource allocation techniques, in accordance with at least one embodiment. The logic may include circuits, software (embodied in a tangible medium) or both to enable more efficient resource allocation among a plurality of cores or processors than in some prior art implementations.

Figure 2:
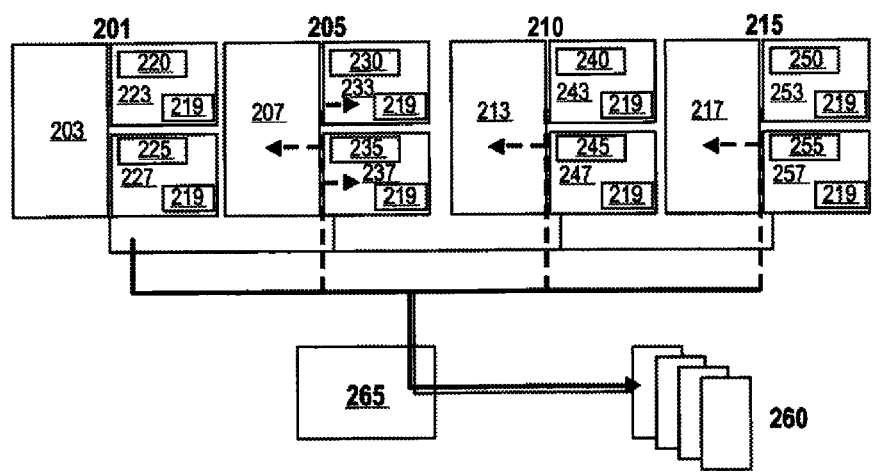
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to enable resource allocation techniques, in accordance with at least one embodiment.

Figure 3:
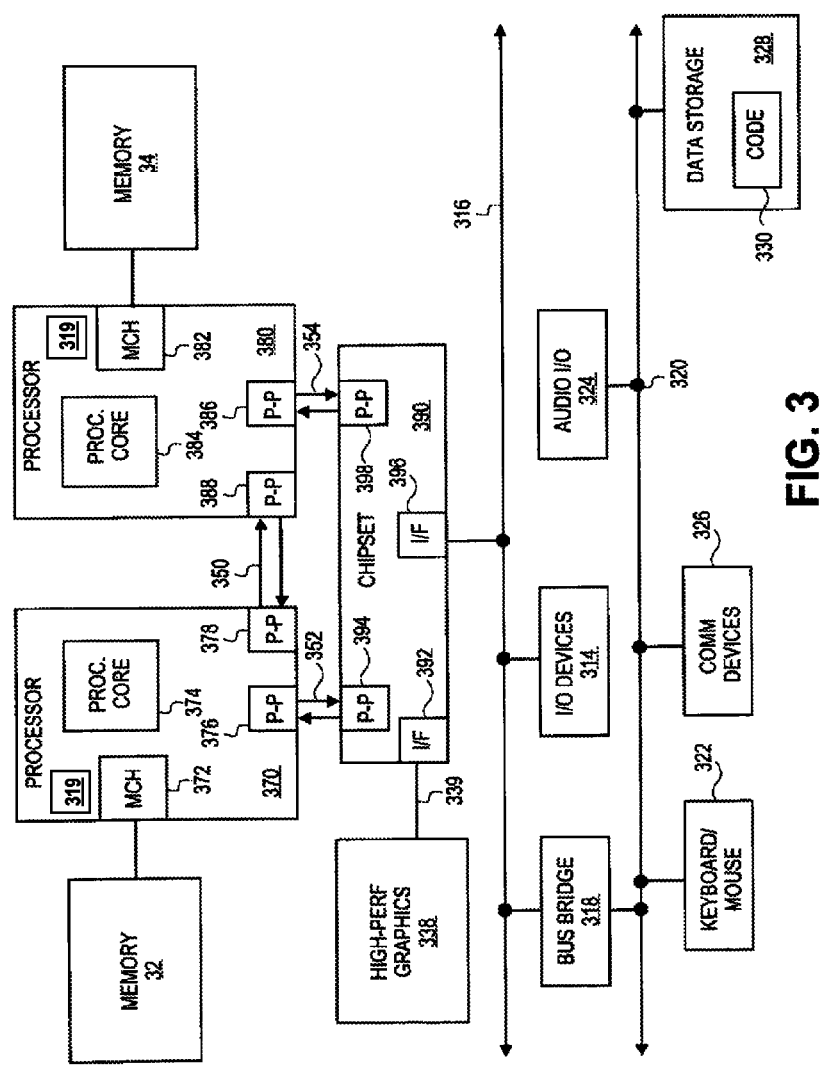
FIG. 3 illustrates a block diagram a point-to-point interconnect computer system, in which at least one embodiment of the invention may be used.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include respectively, processing cores 374, 384 and a local memory controller hub (MCH) 372, 382 to connect with memory 32, 34. Processors 370, 380 may exchange data via a P2P interface 350 using P2P interface circuits 378, 388. Processors 370, 380 may each exchange data with a chipset 390 via individual P2P interfaces 352, 354 using point to point interface circuits 376, 394, 386, 398. Chipset 390 may also exchange data with a high-performance graphics circuit 338 via a high-performance graphics interface 339 using interface circuit 392, and with I/O devices 314 using interface circuit 396 and bus interface 316 or with bus bridge 318 to communicate with keyboard/mouse 322, audio I/O 324, communication device 326, or data storage 328 storing code 330 by using bus interface 320. Embodiments of the invention may be located within any processor having any number of processing cores, or within each of the P2P bus agents of FIG. 3. In one embodiment, any processor core may include or otherwise be associated with a local cache memory (not shown). Furthermore, a shared cache (not shown) may be included in either processor outside of both processors, yet connected with the processors via P2P interconnect, such that either or both processors' local cache information may be stored in the shared cache if a processor is placed into a low power mode. One or more of the processors or cores in FIG. 3 may include or otherwise be associated with logic 319 to enable resource allocation techniques, in accordance with at least one embodiment.

Figure 4A:
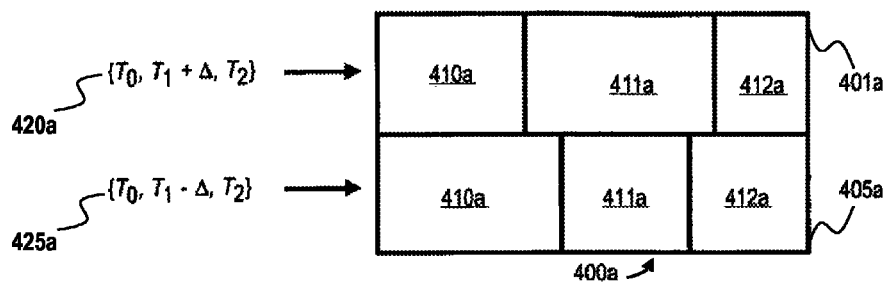
FIG. 4 illustrates a block diagram of logic, in which at least one embodiment of the invention may be implemented.

FIG. 4a illustrates a conceptualization of a cache that is resource-managed according at least one embodiment of the invention. In one embodiment, the cache 400a is logically partitioned into two parts 401a and 405a, each of which being divided into three blocks 410a-412a, corresponding to three different threads. In one embodiment, the three blocks in each partition are controlled in response to changing needs of each thread, corresponding to a particular data class, through the use of a throttle ("T"). In one embodiment, a throttle represents the fraction of the time that a data class is given highest-priority access to the shared resource. In one embodiment, an allocation of resources that favors high-priority access over low-priority access may ensure an optimal allocation of shared resources, given the set of throttles. In one embodiment, throttle 420a and 425a correspond to the effective throttles in the two logical parts of the cache (e.g., sets) and are incremented or decremented by a +delta and −delta in each part, respectively, such that the resource allocation for an initial throttle ($T_0$)+delta will be higher than for a $T_0$−delta. In FIG. 4a, we illustrate cache capacity given a set of throttles for three threads ($T_0$, $T_1$, $T_2$).

Figure 4B:
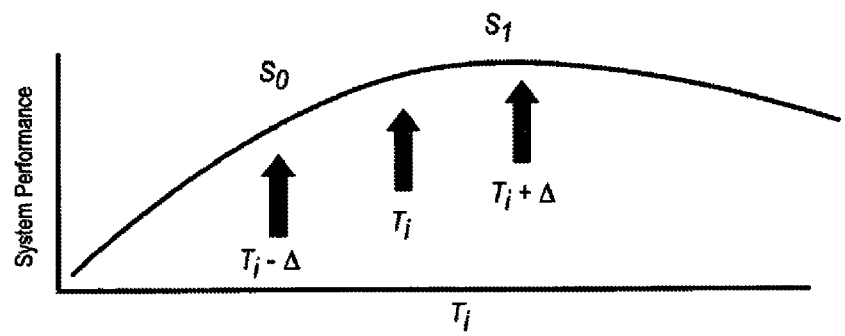

In FIG. 4b, an illustration of a resource allocation test is given, according to one embodiment. In one embodiment, FIG. 4b illustrates two performance measurements on two parts 401a and 405a of the cache 400a, in which the throttle (in this case, $T_1$) is moved in a first direction (in this case, positively) for the first partition 401a for the data class stored in block 411a, whereas the throttle ($T_1$) is moved in a second direction (in this case, negatively) for the second partition 405a for the data class stored in block 411a. The resulting performance metric difference is then determined (the result, of which, is illustrated in FIG. 4b), according to various performance measuring techniques, (including using performance counters). These resource allocation tests may run continually, adapting to phase changes in the program, thread migration/swapping etc., in order to continually optimize the dynamic throttle setting, and therefore the size of the cache capacity allocated to a particular data class or classes. In one embodiment, each data class 410a-412a stored in cache 400a corresponds to a different thread in a multi-threaded program, for example.

Figure 4C:
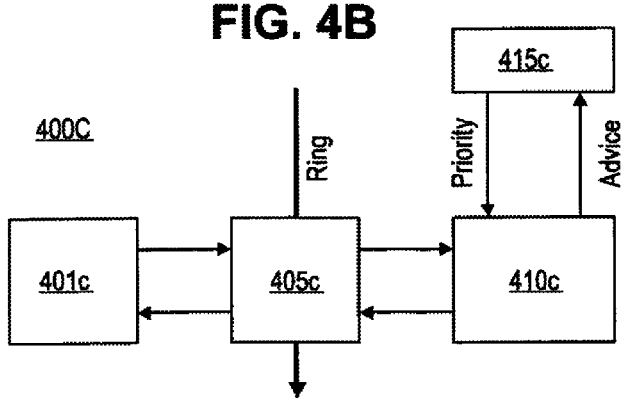

FIG. 4c illustrates logic that may be used in accordance with at least one embodiment. Logic 400c in FIG. 4c illustrates a processing core 401c, an interface logic 405c that interfaces the core to an interconnect (e.g., ring interconnect) and a cache 410c, which may be an inclusive last level cache, L2 cache, etc. In one embodiment, GPA module 415c is used to perform the resource allocation tests described above on the cache 410c and to allocate cache capacity to the data classes (and corresponding threads) according to the throttle setting that results in the highest performance level, metric value of the test on a continual basis. In one embodiment, the interface logic 405c may not be present or may be included in the core or other logic.

In one embodiment, the result of each test on the cache is sent to the GPA module, which determines how to adjust the cache allocations to optimize a global metric, such as cache miss rate. In addition, every time the cache is about to allocate an additional cache block size in the cache for a particular data class, it may request advice (on signal "advice") from the GPA module, which will reply with a priority (on signal "priority"). For instance, an indication of 'high priority' by the GPA module may cause the block size to be increased, whereas a 'low priority' indication from the GPA module may cause the cache to not increase a block size or to increase the block size by an otherwise lesser degree or to set replacement bits such that a block or portion thereof is next to be replaced.

In order to indicate and maintain the appropriate resource allocation information, the GPA module may include state bits for each data class and global bits that span across data classes. For example, for each data class the GPA module may store a total of 38 bits of state including:

| | |
|---|---|
| 18-bits | corresponding to a first performance counter ("referencecounter") |
| 12-bits | corresponding to a second performance counter ("randomWalkCounter") |
| 8-bits | corresponding to throttle control. |

In addition, 4 global registers (for a total of 24 bits) may be used to parameterize the optimization algorithm, including:

| | |
|---|---|
| 4-bits | corresponding to the different cache regions allocated to each data class ("numGradientRegionsLog") |
| 8-bits | corresponding to a first throttle delta ("gradientDelta") |
| 8-bits | corresponding to a second throttle delta ("updateDelta") |

-continued

| |
|---|
| 4-bits corresponding to the sensitivity by which the GPA module will respond to potential performance gains randomWalkThresholdMultiplier |

In one embodiment, the GPA module uses these bits to find optimal allocations of shared resources using a variation of the gradient descent (or "hill climbing") algorithm, where, for each data class, an experiment is conducted, giving that data class incrementally more and then incrementally less of the resource in question. GPA may then use these bits to measure a "global goodness" metric for both scenarios and allocates the nominal ration of the resource to the data class in question according to the experiment. In one embodiment, GPA uses the Chernoff bounds to decide when to adjust the partition of the resource, whereas in other embodiments, other algorithms may be used to determine when to adjust the partition of resources.

Figure 5:
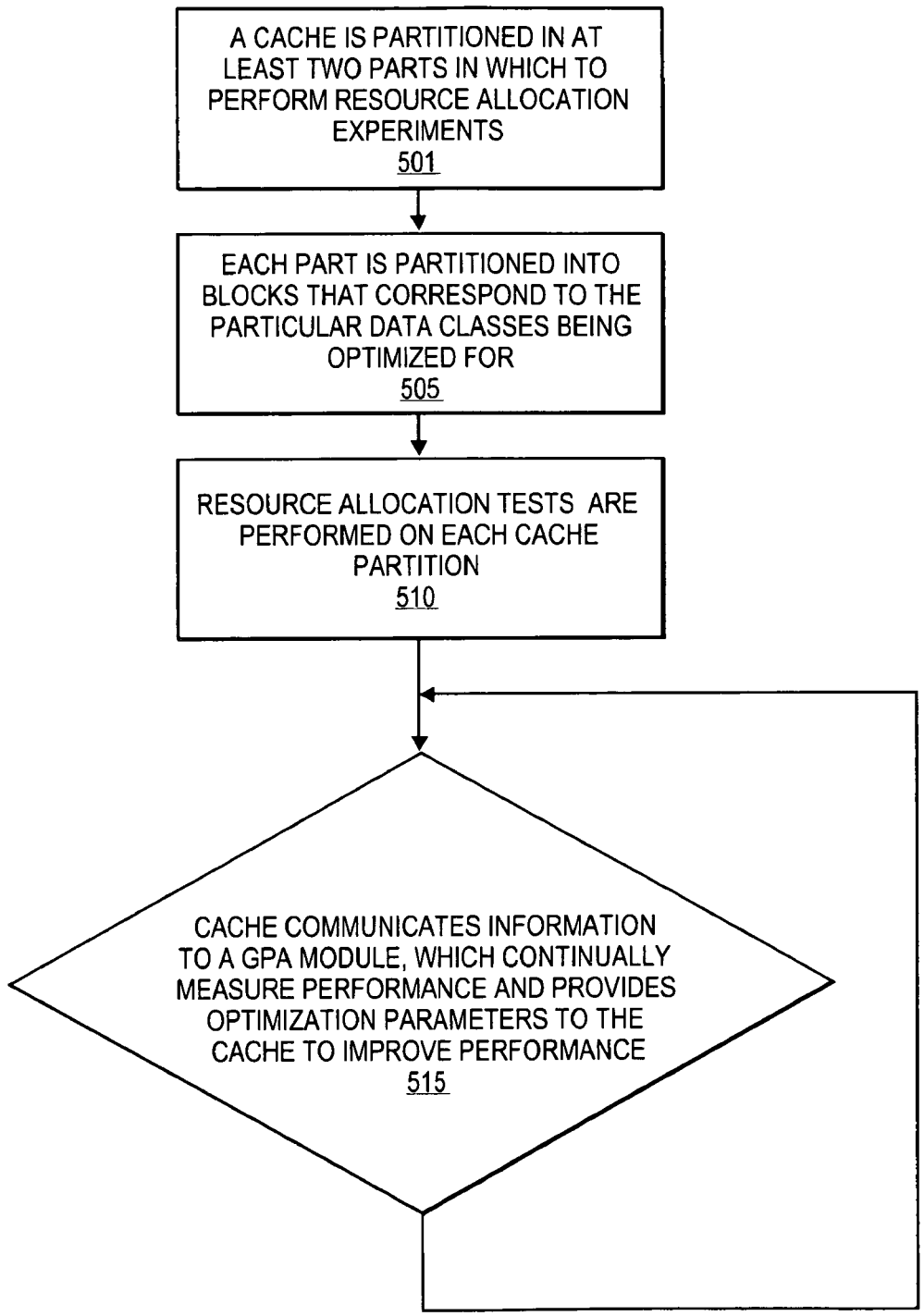
FIG. 5 is a flow diagram of operations that may be used for performing at least one embodiment of the invention.

In one embodiment, in which the above GPA module bits are used to implement a state machine, the state transitions may be described according to the following code example:

FIG. 5 illustrates a flow diagram of operations that may be used in conjunction with at least one embodiment of the invention, regardless of the processor or system configuration in which the embodiment is used. At operation 501, a cache is partitioned in at least two parts in which to perform resource allocation experiments, according to one embodiment. At operation 505, each part is partitioned into blocks that correspond to the particular data classes being optimized for (e.g., streaming data and reused data). In one embodiment, each data class partition within each cache partition corresponds to a different thread. At operation 510, the resource allocation tests are performed on each cache partition, according to the embodiments described above. At operation 515, at various points in the performance of a program, the cache communicates information to a GPA module, which continually measures performance and provides optimization parameters to the cache to improve performance.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on

```
void GRADIENT_PARTITION_ALGORITHM_CLASS::Reference(
    bool _hitEqualsTrue,
    UINT32 _setIndex )
{
    UINT32 setIndex = SetIndexHash( _setIndex );
    UINT32 gradientRegionIndex = setIndex & ( ( 1 << numGradientRegionsLog ) - 1 );
    setIndex = setIndex >> numGradientRegionsLog;
    bool setMap;
    for( UINT32 i = gradientRegionIndex; i < numDataClasses; i = i + ( 1 <<
numGradientRegionsLog ) )
    {
        setMap = XOR( setIndex & ( ( i >> numGradientRegionsLog ) + 1 ) ); // +delta or –delta
        data[ i ].referenceCounter++;
        data[ i ].randomWalk += ( _hitEqualsTrue == setMap ) ? 1 : –1;
        if( ( data[ i ].referenceCounter * randomWalkThresholdMultiplier ) <
            data[ i ].randomWalk * data[ i ].randomWalk )
        { // did we cross the dynamic threshold? If so, move the throttle in the winning direction.
            data[ i ].throttle += ( data[ i ].randomWalk > 0 ) ? updateDelta : –updateDelta;
            data[ i ].throttle = ( data[ i ].throttle > throttleMask ) ? throttleMask : data[ i ].throttle;
            data[ i ].throttle = ( data[ i ].throttle < 0 ) ? 0 : data[ i ].throttle;
            Reset( i ); // reset referenceCounter and randomWalk for the ith data class
        }
        else if( data[ i ].referenceCounter >= maxReferenceCount )
        { // telescoping, which is resetting while preserving some tendency from the previous
experiment
            data[ i ].referenceCounter = data[ i ].referenceCounter >> 2;
            data[ i ].randomWalk = data[ i ].randomWalk >> 1;
        }
    }
}
bool GRADIENT_PARTITION_ALGORITHM_CLASS::InstallAdvice(
    UINT32 _dataClass,
    UINT32 _setIndex )
{
    UINT32 setIndex = SetIndexHash( _setIndex );
    UINT32 gradientRegionIndex = setIndex & ( ( 1 << numGradientRegionsLog ) - 1 );
    setIndex = setIndex >> numGradientRegionsLog;
    bool setMap = XOR( setIndex & ( ( _dataClass >> numGradientRegionsLog ) + 1 ) );
    INT32 randomThrottle = ( INT32 ) ( rand( ) & throttleMask );
    if( gradientRegionIndex == ( _dataClass & ( ( 1 << numGradientRegionsLog ) - 1 ) ) )
    { // we are in a gradient region
        return randomThrottle <= ( data[ _dataClass ].throttle +
                     ( ( setMap == true ) ? gradientDelta : –gradientDelta ) );
    }
    else
    {
        return clock <= data[ _dataClass ].throttle;
    }
}
``` a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus for dynamic resource allocation comprising:
a gradient partition algorithm (GPA) module to control allocation of one or more portions of a processing resource to at least one instruction thread, wherein each portion of the processing resource allocated to each thread of said at least one thread corresponds to one of a plurality of data classes and is partitioned into at least two partitions and, wherein the GPA module performs tests on corresponding partitions of an allocated portion of the processing resource on a per thread basis to identify a gradient direction and to adjust a dynamic throttle setting in the identified direction of the gradient as determined by a performance metric difference between tested corresponding partitions of the processing resource, said dynamic throttle setting representing a fraction of time that highest priority access is to be given to a data class of the tested corresponding partitions.

2. The apparatus of claim 1, wherein the processing resource includes a cache memory.

3. The apparatus of claim 2, wherein the cache memory is to be logically divided into at least two parts, on which the GPA module may perform the tests.

4. The apparatus of claim 3, wherein each of the two logically divided parts comprise at least one block corresponding to the at least one instruction thread.

5. The apparatus of claim 1, wherein the GPA module is to test the performance of the partitioned processing resource as a function of the throttle setting being set to a first setting and to a second setting.

6. The apparatus of claim 5, wherein the GPA module is to provide information to the processing resource to indicate the throttle setting that results in the highest performance level metric value.

7. The apparatus of claim 4, wherein the GPA module includes class data bits corresponding to the at least one instruction.

8. The apparatus of claim 7, wherein the GPA module includes global data bits corresponding to a plurality of instructions.

9. The apparatus of claim 1, wherein identifying the gradient direction is accomplished by performing a plurality of performance measurements at different throttle settings associated with said tests on the partitioned processing resource.

10. The apparatus of claim 1, wherein the direction of the gradient that better meets the processing needs of the at least one instruction thread is determined as which of a plurality of different throttle settings associated with said tests on the partitioned processing resource results in a performance metric improvement.

11. A system comprising:
a processor core;
a cache coupled to the processor core such that a portion of the cache corresponding to a data class allocated to an individual thread is partitioned into at least two partitions;
a gradient partition algorithm (GPA) module to perform tests on the cache in accordance with such a partitioning to identify a gradient direction and to adjust a dynamic throttle setting in the identified direction of the gradient as determined by a performance metric difference between tested corresponding partitions of the portion of the cache, said dynamic throttle setting representing a fraction of time that highest priority access is to be given to a data class of the tested corresponding partitions.

12. The system of claim 11, wherein the cache is to be logically divided into at least two parts, on which the GPA module may perform the tests.

13. The system of claim 12, wherein each of the two logically divided parts comprise a plurality of blocks corresponding to the plurality of instructions.

14. The system of claim 13, wherein the plurality of blocks are to increase or decrease in size, depending on the value of the throttle.

15. The system of claim 14, wherein the tests comprise measuring performance of a first thread corresponding to a first block when the block size is increased by the throttle.

16. The system of claim 15, wherein the tests comprise measuring performance of the first thread correspond to the first block when the block size is decreased by the throttle.

17. The system of claim 16, wherein the GPA module is to set the first block size according to the performance achieved during the tests.

18. The system of claim 17, wherein the GPA module includes class data bits corresponding to each of the plurality of instructions.

19. The system of claim 18, wherein the GPA module includes global data bits corresponding to all of the plurality of instructions.

20. The system of claim 11, wherein identifying the gradient direction is accomplished by performing a plurality of performance measurements at different throttle settings associated with said tests on the partitioned processing resource.

21. The system of claim 20, wherein the direction of the gradient that better meets the processing needs of the at least one instruction thread is determined as which of the different throttle settings is associated with a-performance metric improvement.

22. A method comprising:
partitioning a cache in at least two parts, in which to perform resource allocation tests;
partitioning each of the at least two parts into a plurality of blocks corresponding to a plurality of data classes;
continually performing the tests on said blocks, of each of the at least two parts, corresponding to a data class and comparing corresponding performance results with each other, wherein the test is performed on one of the at least two parts at a first throttle setting and the test is performed on a second of the least two parts at a second throttle setting, said first and second throttle settings representing a fraction of time that highest priority access is to be given to the corresponding data class for said one of the at least two parts and for said second of the least two parts, respectively;
adjusting the size of at least one of the plurality of blocks in response to the comparison of the corresponding performance results.

23. The method of claim 22, wherein the plurality of blocks are to increase or decrease in size, depending on the setting of the throttle.

24. The method of claim 23, wherein the tests comprise measuring performance of a first thread corresponding to a first block when the block size is increased by the throttle setting.

25. The method of claim 24, wherein the tests comprise measuring performance of the first thread correspond to the first block when the block size is decreased by the throttle.

26. The method of claim 25, comprising setting a first block size according to the performance achieved during the tests.

27. The method of claim 26, wherein class data bits corresponding to each of the plurality of data classes are maintained.

28. The method of claim 27, wherein global data bits corresponding to all of the plurality of data classes are maintained.

* * * * *